(12) United States Patent
Balinsky et al.

(10) Patent No.: US 9,608,811 B2
(45) Date of Patent: Mar. 28, 2017

(54) MANAGING ACCESS TO A SECURE DIGITAL DOCUMENT

(75) Inventors: Helen Balinsky, Cardiff (GB); Steven J. Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1100 days.

(21) Appl. No.: 12/949,510

(22) Filed: Nov. 18, 2010

(65) Prior Publication Data

US 2012/0131351 A1  May 24, 2012

(51) Int. Cl.
*H04L 9/00* (2006.01)
*H04L 9/08* (2006.01)
*G06F 21/62* (2013.01)

(52) U.S. Cl.
CPC ........ *H04L 9/0825* (2013.01); *G06F 21/6209* (2013.01); *H04L 2209/68* (2013.01)

(58) Field of Classification Search
CPC . H04L 9/0825; H04L 2209/68; H04L 63/045; H04L 9/0836; H04L 9/3247; H04L 12/1822; G06F 21/6209; G06F 21/64; G06F 2221/2147
USPC .................................................. 713/189, 193
See application file for complete search history.

(56) References Cited

U.S. PATENT DOCUMENTS

| | | | |
|---|---|---|---|
| 5,787,175 A * | 7/1998 | Carter ................. | G06F 21/6209 707/999.008 |
| 7,386,724 B2 | 6/2008 | Coldicott et al. | |
| 7,496,767 B2 | 2/2009 | Evans | |
| RE43,906 E * | 1/2013 | Garcia .......................... | 713/165 |
| 2003/0217264 A1 | 11/2003 | Martin et al. | |
| 2005/0039034 A1* | 2/2005 | Doyle et al. .................. | 713/193 |
| 2006/0047977 A1 | 3/2006 | Hanasaki | |
| 2006/0075228 A1 | 4/2006 | Black et al. | |
| 2008/0034205 A1* | 2/2008 | Alain et al. ................... | 713/160 |
| 2009/0150761 A1 | 6/2009 | Sawicki et al. | |
| 2010/0046749 A1* | 2/2010 | Hatano et al. .................. | 380/44 |

FOREIGN PATENT DOCUMENTS

JP 2005184222 A 7/2005

* cited by examiner

*Primary Examiner* — Abdulkader M Alriyashi
(74) *Attorney, Agent, or Firm* — Dicke, Billig & Czaja, PLLC (PAT)

(57) ABSTRACT

In a method for managing access to a secure digital document by workflow participants, in which a respective public key is associated with each of the workflow participants, an entry table is populated with a participant entry for each of the workflow participants. Each of the participant entries includes a map entry identifier that corresponds to a map entry tag in a map file, and a first label associated with the map entry identifier. In addition, symmetric keys for the workflow participants are accessed and each of the first labels is encrypted using a respective symmetric key to generate a plurality of second labels, the entry table is populated with the plurality of second labels, each of the plurality of symmetric keys is encrypted with the public key of a respective workflow participant, and the entry table is incorporated into the digital document.

20 Claims, 6 Drawing Sheets

| | ATOMIC UNIT A 122a | ATOMIC UNIT B 122b | ATOMIC UNIT C 122c |
|---|---|---|---|
| WORKFLOW PARTICIPANT A 110a | MODIFY ACCESS | NO ACCESS | NO ACCESS |
| WORKFLOW PARTICIPANT B 110b | READ ONLY ACCESS | READ ONLY ACCESS | MODIFY ACCESS |

410

| | ATOMIC UNIT A 122a | ATOMIC UNIT B 122b | ATOMIC UNIT C 122c |
|---|---|---|---|
| WORKFLOW PARTICIPANT A 110a | $E_1 \; D_1 \; S_1 \; V_1$ | $V_2$ | $V_3$ |
| WORKFLOW PARTICIPANT B 110b | $D_1 \quad V_1$ | $D_2 \quad V_2$ | $E_3 \; D_3 \; S_3 \; V_3$ |

MANAGING ACCESS TO A SECURE DIGITAL DOCUMENT

CROSS REFERENCE TO RELATED APPLICATIONS

The present application contains common subject matter with copending and commonly assigned PCT Application Serial No.: PCT/US10/49638, entitled "Providing Differential Access to a Digital Document", filed on Sep. 21, 2010, the disclosure of which is hereby incorporated by reference in its entirety.

BACKGROUND

In recent years, there has been a growing trend to move away from printing information on paper and instead, to the use of digital documents, which contain digital content. Examples of digital documents include, for instance, portable document format (pdf) documents, electronic spreadsheets, electronic drawings, documents generated through use of a word processing application, and html pages. The digital documents may also include composite documents that include a mixture of different types of formats.

With paper documents, an individual's signature or other handwritten marks are used to determine whether various changes or additions to the documents were made by an authorized individual. However, such modifications are not possible or are inconvenient with digital documents because these types of modifications will require the individual to print the digital document, sign or otherwise mark the document, and scan the marked document to prove that the modifications were made by the individual. This manner of controlling access to the documents, both paper and electronic, is easily attacked and may easily be counterfeited.

Various techniques have been proposed to prevent or reduce attacks and counterfeiting of digital documents. These techniques typically employ a database, such as, but not limited to filesystem, Sharepoint, etc., upon which the digital documents are stored so that access to the database or a network to which the database is connected, is controlled by preventing access to the database or network to a user unless that user possesses some secret information, such as, a user identification and password. As such, in order for these security techniques to enforce access control on the digital documents, users are required to be granted access to the database or network. However, access to the database or network is typically prohibited or undesirable for various security reasons, such as, to prevent access by contractors or non-employees of the corporate or government entity that owns the database or network. In addition, it is desirable for users to be granted access to the database or network securely.

Another technique for protecting the contents of digital documents is through encryption of the digital documents using various encryption and signature keys, such as in public-private cryptography. Although this form of protection has been found to be relatively effective, there are a number of issues pertaining to efficiently and securely distributing keys to enable a plurality of users to decrypt and verify the signatures of the encrypted digital documents.

BRIEF DESCRIPTION OF THE DRAWINGS

Features of the present disclosure will become apparent from the following description with reference to the figures, in which.

DETAILED DESCRIPTION

For simplicity and illustrative purposes, the present disclosure is described by referring mainly to an example thereof. In the following description, numerous specific details are set forth to provide a thorough understanding of the present disclosure. However, it will be apparent that the present disclosure may be practiced without limitation to these specific details. In other instances, some methods and structures have not been described in detail so as not to unnecessarily obscure the present disclosure.

Throughout the present disclosure, the term "n" following a reference numeral is intended to denote an integer value that is greater than 1. In addition, ellipses (" . . . ") in the figures are intended to denote that additional elements may be included between the elements surrounding the ellipses. Moreover, the terms "a" and "an" are intended to denote at least one of a particular element. As used herein, the term "includes" means includes but not limited to, the term "including" means including but not limited to. The term "based on" means based at least in part on.

Disclosed herein are a method and apparatus for managing access to a secure digital document/atomic units by a plurality of workflow participants, in which the workflow participants comprise users who have been identified as recipients of the secure digital document/atomic units at some point during a workflow of the secure digital document. As used throughout the present disclosure, a secure digital document comprises a digital document that has been encrypted and signed. The digital document may comprise a composite document, which is composed of a variety of individual addressable and accessible parts (units) in the form of separate files or addressable file fragments. For example, the units may include individual files, groups of files, or file fragments, such as, html fragments, xml nodes and elements, presentation slides, word processing text boxes, parts of a spreadsheet document, an electronic object containing drawings, an electronic object having flash video capabilities, etc., and combinations of different types of units. The individual addressable and accessible parts are recited as "atomic units" throughout the present disclosure. In addition, the atomic units of a particular digital document may comprise the same format or different formats from each other or a single atomic unit may include fragments and files having different formats from each other, As also disclosed herein, access to a digital document, or to the atomic units contained in the digital document, by the workflow participants may be managed through control of the types of and numbers access keys supplied to each of the workflow participants for the digital documents/atomic unit(s) contained in the digital document. More particularly, the keys may be contained in key entries in a map file, with at least one map-file entry for each workflow participant, which are correlated to respective map entry tags. Thus, for a relatively large workflow there may be a large number of separate map-file entries in the map file, which is equal to or larger than the number of workflow participants. As discussed in greater detail herein below, each map-file entry is encrypted and is intended to be decrypted only by the intended workflow participant. While it is possible to provide sufficient information in the map file for each workflow participant to identify his own map file entry, for example, by associating user name/nickname or other known attribute to the corresponding map file entries, the addition of this information may be undesirable or forbidden in various workflow situations. For instance, and as also discussed herein, the digital document may be distributed over potentially non-secure channels, thus exposing user's identities and their relations to the digital document, which may result in privacy considerations/infringements.

In any regard, the map entry tags comprise any suitable form of identification that may be used to distinguish the map entry tags from each other, such as, for instance, text, characters, symbols, colors, etc. In addition, the key entries may be encrypted such that only those workflow participants having the correct keys to decrypt the key entries are able access the keys contained in the key entries.

As discussed in greater detail herein below, at least some of the map file entries correspond to at least some participant entries in an entry table. As also discussed below, various encryption keys are employed to prevent unauthorized access to the map file entries. An example of a manner in which encryption keys are assigned to two workflow participants is provided with respect to the following Table I. In Table I, each row corresponds to a particular workflow participant.

| column 1 | column 2 | column 3 | column 4 |
|---|---|---|---|
| $Enc_{K1}(S1)$ | $Enc_{S1}(p1)$ | string p1 | $Enc_{S1}$ (map-file2343) |
| $Enc_{K2}(S2)$ | $Enc_{S2}(p2)$ | string p2 | $Enc_{S2}$ (map-file39873) |

As shown in Table I, identity strings p1, p2, etc., are selected for the workflow participants. The identity strings p1, p2, etc., may be the same or differ for each of the workflow participants. In addition, the identity strings p1, p2, etc., may be pre-defined, previously agreed upon, randomly generated, etc.

In addition, Table I shows that one symmetric key (S1, S2, . . . ) is generated and assigned for each workflow participant. The symmetric keys are different for each user to avoid collision and meet accepted security standards for the policies governing the digital document (for instance, the advanced encryption standard (AES)). Using this symmetric key, the map-file entry (and the map-file itself) are encrypted, as shown in column 4 of the Table I. In addition, using this symmetric key, the corresponding identity string p1, p2, etc., is encrypted, as shown in column 2 of the Table I. Moreover, each symmetric key (S1, S2, . . . ) is encrypted using the known Public Key (PK) of the corresponding workflow participant (Ki).

In one regard, each of the map file entries may be encrypted using a public key of a workflow participant who is intended to access the keys contained therein. Through control of the encryption of the key entries, therefore, access to the secure digital document/atomic unit(s) may be controlled.

It is often desirable to hide which of the map file entries are for which of the workflow participants. In this regard, and according to an example of the present disclosure, the map file may be generated without any indication as to which of the workflow participants has keys for decrypting which of the map file entries. In other words, the association between the workflow participants and the map file entries may not be discernable from the map entry tags or key entries themselves. Thus, the workflow participants would be required to attempt to decrypt each of the key entries in the map file entries individually to determine which of the key entries have been encrypted with the workflow participant's public key, for instance. This would require a relatively large amount of time and computational resources, especially for map files containing large numbers of map file entries and workflows containing large numbers of workflow participants Also disclosed herein is an entry table that contains a reference to the map file tags through which the workflow participants may relatively easily and automatically determine which of the map file entries belong to them and need to be decrypted for access to an encrypted digital document/atomic units. The workflow participants do not know which row the Table I belongs to them, but each of the workflow participants possesses the private key corresponding to Public key K1 or K2 (as he is a legitimate workflow participant). As such, each of the workflow participants is required to recover the name and contents of his own map file entry. Using his private key, the workflow participant attempts to decrypt the contents of column 1 from each row sequentially. Each time the workflow participant recovers some binary data that could be his symmetric key (S1 or S1), he then uses the recovered Si* to decrypt the corresponding column 2. If this is the workflow participant's row, then as the result of the last decryption, the workflow participant will receive: $Decrypt_{S1*} (Enc_{S1} (p1))$ is equal to p1. This may easily be verified automatically. The condition will only be true for his intended row. Once the condition is found to be true, the encrypted information in column 4 from the corresponding row is decrypted and the name of the corresponding map-file entry is recovered.

As discussed below, the entry table includes a plurality of first labels associated with respective map entry identifiers, in which the map entry identifiers correspond to respective ones of the map entry tags in the map file entries. Thus, for instance, the map entry identifiers may contain the same information as corresponding ones of the map entry tags. The entry table also includes a plurality of second labels, which are encrypted versions of the first labels. As discussed in greater detail herein below, the same symmetric keys are used to encrypt the key entries and the first labels that correspond to the key entries.

Generally speaking, the first labels comprise relatively short words or other combinations of symbols and/or characters that enable the first labels to be distinguishable from each other. In addition, the second labels may also comprise relatively short words or other combinations of symbols. In one regard, the second labels comprise relatively smaller sized files as compared to the encrypted key entries in the map file. In this regard, decryption of the second labels requires less time and computational resources as compared with decryption of the key entries in the map file. As such, the attempt by the workflow participants to decrypt each of the second labels may require significantly less time and computational resources as compared with an attempt to decrypt each of the key entries in the map file. For a second label that a workflow participant is able to decrypt, the decrypted second label will appear similar to or match the first label that was encrypted using the workflow participant's symmetric key to generate that second label.

A determination as to which of the map entry identifiers corresponds to that first label is made through a comparison of the first labels and the map entry identifiers in the entry table. In addition, and from that determination, a determination as to which of the map file tags in the map file corresponds to that map entry identifier may be made. In addition, the key entry contained in the determined map file entry that corresponds to that map entry tag may be decrypted to obtain the necessary keys for accessing the secure digital document/atomic units. As such, the workflow participant need not attempt to decrypt each of the key entries in the map file to obtain the keys.

It may also often be desirable to hide the number of workflow participants that are to receive the keys from the key entries in the map file. In this regard, and according to an example of the present disclosure, the entry table may be populated with pseudo-participant, or "false participant", entries and second labels as discussed herein. In addition, the map file may be generated to include a corresponding number of pseudo map file entries as also discussed herein.

Through implementation of the method and apparatus disclosed herein, workflow participants may be supplied with the necessary keys to access the secure digital document/atomic unit(s) according to their determined access types in a relatively simple and secure manner. For instance, the secure digital document/atomic unit(s) and the keys to enable the workflow participants to access the secure digital document/atomic unit(s) may be distributed to the workflow participants over a common distribution channel. In addition, the workflow participants may access the keys without being required to spend a relatively long period of time and a relatively large number of computational resources.

In one regard, the method and apparatus disclosed herein may be employed in instances in which not all of the workflow participants are located within or have access to a common shared and uniformly-secure environment. By way of example, the secure digital documents may be created in collaborative workflows preceding a potential merger and acquisition with participants involved from both companies. In this regard, differential types of access may be granted to the participants from each of the companies. As other examples, enterprises may join together in an effort to create a new standard, universities may join together with industrial partners to participate in a government funded research program, companies may partner with each other in collaborative efforts to create new products and services or to prepare joint bids, etc. Each of these examples is based upon relatively complicated, collaborative workflows among various participants who may be given differential access types to secure digital documents. Oftentimes, the lack of an owner or trusted third party to manage and maintain the workflow among the participants results in the secure digital documents being shipped among the participants through relatively low security channels, such as, e-mail. The method and apparatus disclosed herein provide a mechanism through which the secure digital document may be shipped by non-secure channels among the various participants, while maintaining a relatively high level of security and differential access control With reference first to FIG. 1, there is shown a simplified diagram of a digital document workflow 100, according to an example. It should be apparent that the diagram depicted in FIG. 1 represents a generalized illustration and that other components may be added or existing components may be removed, modified or rearranged without departing from a scope of the digital document workflow 100.

The digital document workflow 100 is depicted as including an access management apparatus 102 and a plurality of workflow participants 110a-110n. The digital document workflow 100 is also depicted as including a digital document 120 containing a plurality of atomic units 122a-122n. Generally speaking, the access management apparatus 102 is to manage differential access to the digital document 120 as a whole or to the atomic units 122a-122n by each of the workflow participants 110a-110n through creation of map file entries containing the necessary keys corresponding to the access granted to the workflow participants 110a-110n.

Figure 1:
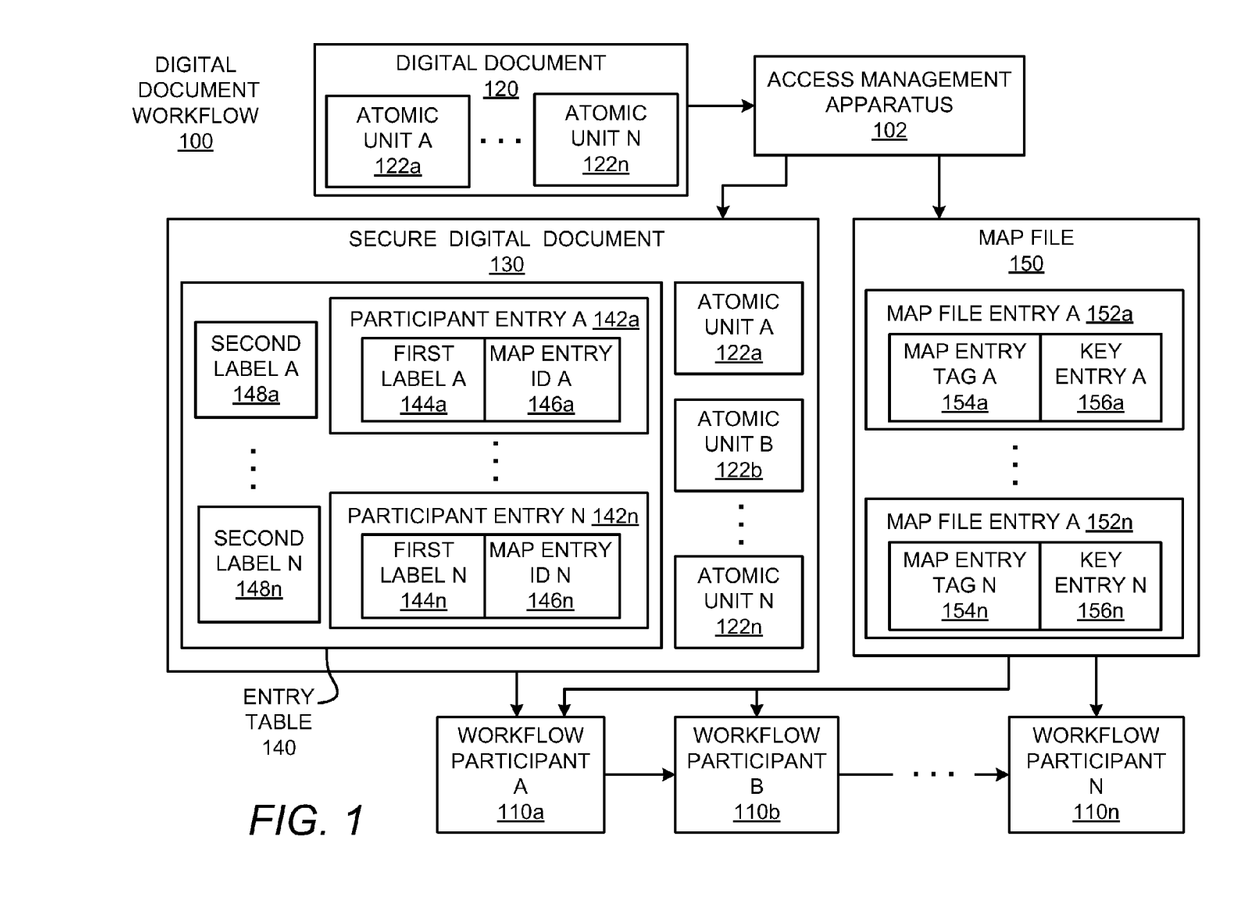
FIG. 1 illustrates a simplified schematic diagram of a digital document workflow, according to an example of the present disclosure.

Also shown in FIG. 1 is a secure digital document 130, which may comprise, for instance, an encrypted and signed version of the digital document 120/atomic unit(s) 122a-122n. The secure digital document 130/atomic unit(s) 122a-122n may be encrypted through use of an encryption key and may be signed through use of a signature key. The atomic units 122a-122n contained in the secure digital document 130 may also be encrypted and signed through use of various encryption keys and signature keys. In one example, the access management apparatus 102 may encrypt and sign the digital document/atomic units. In another example, another apparatus (not shown) may encrypt and sign the digital document/atomic units.

In any regard, respective keys to enable decryption and verification of the secure digital document 130/atomic unit(s) 122a-122n may be inserted into a map file 150. As discussed in greater detail herein below, the determination of which of the keys are included in the key entries 156a-156n is dependent upon the type of access granted to the workflow participants 110a-110n to which the key entries 156a-156n are associated. In any regard, the keys or respective sets of keys to enable the decryption and verification may be inserted into the key entries 156a-156n of respective map file entries 152a-152n. In addition, the key entries 156a-156n may be encrypted using the public keys of the workflow participants 110a-110n that are to receive the keys and therefore access the secure digital document 130/atomic unit(s) 122a-122n. Thus, a key entry 156a containing keys for a first workflow participant 110a to access the secure digital document 130 may be encrypted using a public key of the first workflow participant 110a. Likewise, a second key entry 156b containing keys for a second workflow participant 110b to access the secure digital document 130 may be encrypted using a public key of the second workflow participant 110b.

Each of the map file entries 152a-152n also includes a respective map entry tag 154a-154n that corresponds to respective ones of the key entries 156a-156n. As discussed below, instead of attempting to decrypt all of the key entries 156a-156n, the workflow participants 110a-110n may use the map entry tags 154a-154n to determine which of the key entries 156a-156n to decrypt. According to an example, the map file entries 152a-152n are arranged with respect to each other in any suitable manner to prevent any correlation between the order of the map file entries 152a-152n and the order in which the workflow participants 110a-110n are to receive the secure digital document 130/atomic unit(s) 122a-122n.

The map file 150 may be distributed to each of the workflow participants 110a-110n. As discussed above, the attempt to decrypt each of the key entries 156a-156n by the workflow participants 110a-110n may require relatively long periods of time as well as relatively large computational resources. In one regard, and according to an example of the present disclosure, an entry table 140 is generated that contains information that the workflow participants 110a-110n may use to determine which of the map file entries 152a-152n contains key entries 156a-156n that have been encrypted using their respective public keys.

As shown in FIG. 1, the entry table 140 includes a plurality of participant entries 142a-142n and a plurality of second labels 148a-148n. Each of the participant entries 142a-142n is also depicted as including a first label 144a-144n and a map entry identifier (ID) 146a-146n associated with a respective first label 144a-144n. Each of the map entry identifiers 146a-146n corresponds to one of the map entry tags 154a-154n in the map file 150. The first labels 144a-144n comprise relatively short words or other combinations of symbols and/or characters, in which the first labels 144a-144n comprise different words or other combinations of symbols and/or characters from each other.

The second labels 148a-148n comprise encrypted versions of the first labels 144a-144n. More particularly, for instance, a first label 144a may be encrypted using a symmetric key generated for a first workflow participant 110a-110n to generate one of the second labels 148a. Likewise, another first label 144b may be encrypted using a symmetric key generated for a second workflow participant 110a-110n to generate another one of the second labels 148b, and so forth. In addition, the symmetric key of the same workflow participant 110a may be used to encrypt multiple ones of the first labels 144a-144n. According to an example, the symmetric keys of the same workflow participants 110a-110n are used to encrypt the key entries 156a-156n and the corresponding first labels 144a-144n. In addition, the symmetric keys are encrypted using respective public keys of the workflow participants 110a-110n. Although not shown in FIG. 1, the encrypted symmetric keys may also be included in the entry table 140.

In any regard, the participant entries 142a-142n and the second labels 148a-148n may be arranged in any order to thus prevent any correlation between the order of the participant entries 142a-142n and the second labels 148a-148n and the order in which map file entries 152a-152n are arranged in the map file 150.

According to an example, each of the workflow participants 110a-110n may attempt to decrypt the encrypted symmetric keys used to encrypt each of the second labels 148a-148n using their respective private keys. For instance, a first workflow participant 110a may attempt to decrypt each of the encrypted symmetric keys sequentially until the first workflow participant 110a is able to decrypt one of the encrypted symmetric keys. In addition, the decrypted symmetric key may be employed to decrypt a particular second label 148a that was encrypted using that symmetric key. The result of the decryption is an identification of the first label 144b that corresponds to the particular second label 148b. The map entry identifier 146b that corresponds to that first label 144b may also be identified. In addition, a determination as to which of the map entry tags 154b of the map file 150 corresponds to that map entry identifier 146b may be made. Moreover, the key entry 156b that corresponds to that map entry tag 154b may be decrypted using the first workflow participant's 110a symmetric key. In this regard, the first workflow participant 110a is not required to attempt to decrypt all of the key entries 156a-156n contained in the map file 150. Instead, the first workflow participant 110a need only decrypt those key entries 156a-156 that correspond to the second labels 148a-148n that were encrypted using the first workflow participant's 110a symmetric key to obtain keys for accessing the secure digital document 130/ atomic unit(s) 122a-122n.

Each of the remaining workflow participants 110b-110n may perform similar operations on the entry table 140 and the map file 150 to obtain their respectively assigned keys from the map file 150. Although not expressly discussed, the workflow participants 110a-110n may also verify signatures associated with the encrypted second labels 148a-148n and the encrypted key entries 156a-156n.

According to an example, the entry table 140 is populated with a number of pseudo participant entries and pseudo second labels, both of which have no association with any of the workflow participants 110a-110n and have similar respective appearances to the participant entries and second labels. The pseudo participant entries and the pseudo second labels may be employed to hide, for instance, the number of workflow participants 110a-110n that have been identified to receive the secure digital document 130/atomic unit(s) 122a-122n. In addition, the map file 140 may also include a number of pseudo map file entries that have no association with any of the keys used to encrypt the secure digital document 130/atomic unit(s) 122a-122n. The number of pseudo map file entries may be equivalent to the number of pseudo participant entries to aid in the hiding of the number of workflow participants 110a-110n.

The entry table 140 may comprise, for instance, an extensible markup language (XML)-file, a table in (SQL)-database based document, a comma separated value (CSV)-file, etc. In addition, the entry table 140 may be incorporated into the secure digital document 130 as shown in FIG. 1. In one example, the entry table 140 is inserted as meta data of the secure digital document 130. In another example, the entry table 140 is inserted into the secure digital document 130 through printing of the entry table 140 directly on the secure digital document 130. In one regard, therefore, a separate channel may not be required to supply the workflow participants 110a-110n with the entry table 140. However, the map file 150 may be supplied separately from the secure digital document 130 to the workflow participants 110a-110n because the map file 150 may comprise a relatively large file size.

The access management apparatus 102 may generate the map file 150 and may supply the map file 150 to the workflow participants 110a-110n. In one example, the access management apparatus 102 may encrypt and sign the digital document 120/atomic unit(s) 122a-122n with at least one set of keys and may generate the map file 150 to include the keys. In another example, the digital document 120/atomic unit(s) 122a-122n may be encrypted and signed by a separate apparatus (not shown) and the access management apparatus 102 may receive the keys used for the encryption and signing from the separate apparatus.

In any regard, the access management apparatus 102 may comprise a hardware device, such as, a computer, a server, a circuit, etc., configured to perform various functions in the digital document workflow 100. The various functions that the access management apparatus 102 may perform are discussed in greater detail herein below.

The workflow participants 110a-110n generally represent computing devices through which the workflow participants 110a-110n may receive, and when granted sufficient access, to at least one of view, edit, and acknowledge the secure digital document 130/atomic unit(s) 122a-122n. The computing devices may comprise, for instance, personal computers, laptop computers, tablet computers, personal digital assistants, cellular telephones, etc.

According to an example, the access management apparatus 102 may be in a secure environment where the digital document owner/creator/master has access to the apparatus 102, and some or all the computing devices of the workflow participants 110a-110n are outside of the secure environment. In other words, some or all of the workflow participants 110a-110n may not access the secure digital document 130/access unit(s) 122a-122n from a common database that controls access to the secure digital document 130/access unit(s) 122a-122n. Instead, the secure digital document 130/access unit(s) 122a-122n may be supplied to one of the workflow participants 110a and the secure digital document 130/access unit(s) 122a-122n may be transferred among the workflow participants 110a-110n according to a predetermined workflow order through, for instance, e-mail, a shared server, direct file transfer, removable storage medium, etc. Some or all of the workflow participants 110a-110n may not be granted access to the secure environment of the apparatus 102 in instances where such access is impractical or prohibited.

The digital document 120 may comprise a complete digital document or documents, portions of a digital document, or fragments of data. In addition, when the digital document 120 is formed of multiple documents, pages, slides, etc., each of the different documents, pages, slides, etc. may be in the same or different formats with respect to each other. Examples of suitable document types include, for instance, portable document format, spreadsheet, presentation slides, JPEG or any other image, word processing document, hypertext markup language (html), etc. In addition, the atomic units 122a-122n generally comprise individual addressable elements within the digital document 120, such as signature lines, cells or columns within a spreadsheet, paragraphs, graphics boxes, etc. In addition, or alternatively, the digital document 120 comprises a plurality of documents and each of the documents comprises an atomic unit 122a-122n.

Figure 2:
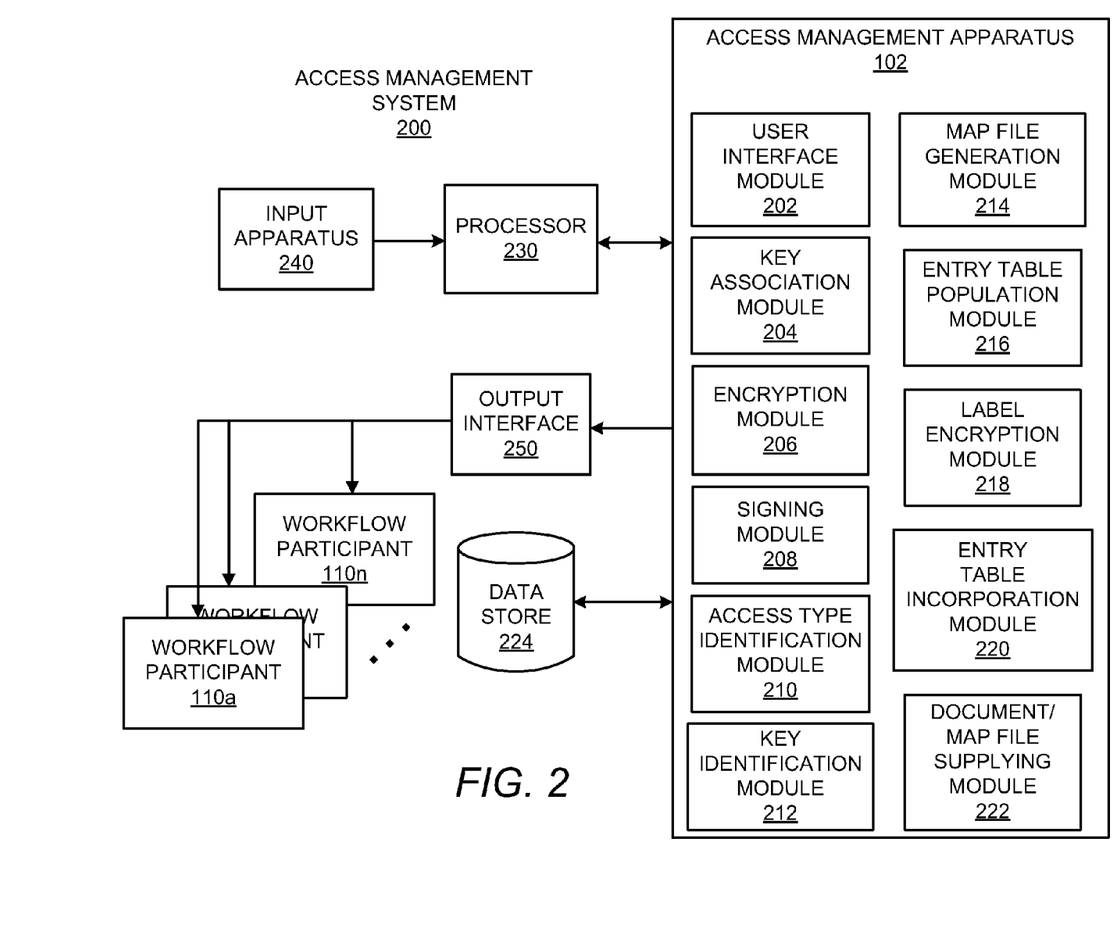
FIG. 2 shows a simplified block diagram of a key distribution control system containing the key distribution control apparatus depicted in FIG. 1, according to an example of the present disclosure.

With particular reference now to FIG. 2, there is shown a simplified block diagram of an access management system 200 containing the access management apparatus 102 depicted in FIG. 1, according to an example. It should be apparent that the block diagram depicted in FIG. 2 represents a generalized illustration and that other components may be added or existing components may be removed, modified or rearranged without departing from a scope of the access management system 200.

As shown in FIG. 2, the access management apparatus 102 includes a user interface module 202, a key association module 204, an encryption module 206, a signing module 208, an access type identification module 210, a key identification module 212, a map file generation module 214, an entry table populating module 216, a label encryption module 218, an entry table incorporation module 220, and a document/map file supplying module 222. The modules 202-222 may comprise modules containing machine readable instructions, hardware modules, or a combination of modules containing machine readable instructions and hardware modules. Thus, in one example, at least one of the modules 202-222 comprises circuit components. In another example, at least one of the modules 202-222 comprises machine readable instructions stored on a computer readable storage medium, which is executable by a processor.

In any regard, the access management apparatus 102 is to be implemented and/or executed by a processor 230. Thus, for instance, the access management apparatus 102 may comprise an integrated and/or add-on hardware device of a computing device comprising the processor 230. As another example, the access management apparatus 102 may comprise a computer readable storage device upon which machine readable instructions for each of the modules 202-220 is stored and executed by the processor 230.

As further shown in FIG. 2, the processor 230 is to receive input from an input apparatus 240. The input apparatus 240 may comprise, for instance, a user interlace through which a user may supply keys for use in encrypting the digital document 120, the atomic units 122a-122n. The input apparatus 240 may also comprise a user interface through which the workflow participants 110a-110n may provide the access management apparatus 102 with their respective public keys. In addition, the input apparatus 240 may be used as an interface through which access types to be granted to the secure digital document 130/atomic unit(s) 122a-122n to each of the workflow participants 110a-110n may be inputted. In any regard, the processor 230 is to execute or implement the access management apparatus 102 to perform various functions with respect to the digital document workflow 100 depicted in FIG. 1 and discussed in greater detail herein below. In one regard, the processor 230 may control the output of the secure digital document 130, the entry table 140, and/or the map file 150 to a workflow participant 110a through the output interface 250.

The various keys used to encrypt and sign the digital document 120 and/or atomic units 122a-122n as well as the public keys of the workflow participants 110a-110n may be stored in a data store 224. Various keys used to decrypt and verify the signatures of the secure digital document 130/atomic unit(s) 122a-122n may also be stored in the data store 224. The data store 224 may comprise volatile and/or non-volatile memory, such as DRAM, EEPROM, MRAM, phase change RAM (PCRAM), Memristor, flash memory, and the like. In addition, or alternatively, the data store 224 may comprise a device to read from and write to a removable media, such as a floppy disk, a CD-ROM, a DVD-ROM, or other optical or magnetic media.

Figure 3A:
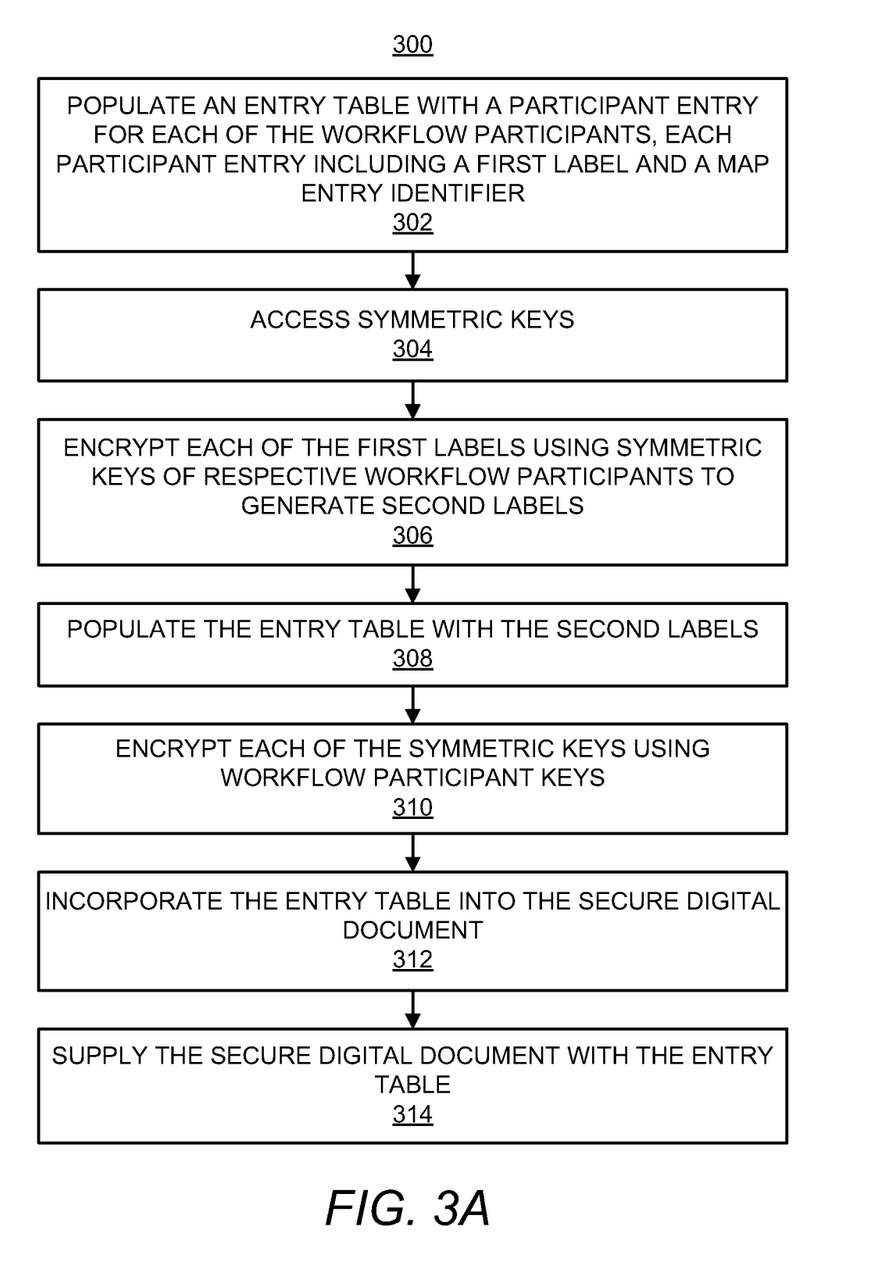
FIGS. 3A and 3B, respectively, show flow diagrams of methods for providing access to an encrypted digital document to a plurality of workflow participants, according to an example of the present disclosure.
Figure 3B:
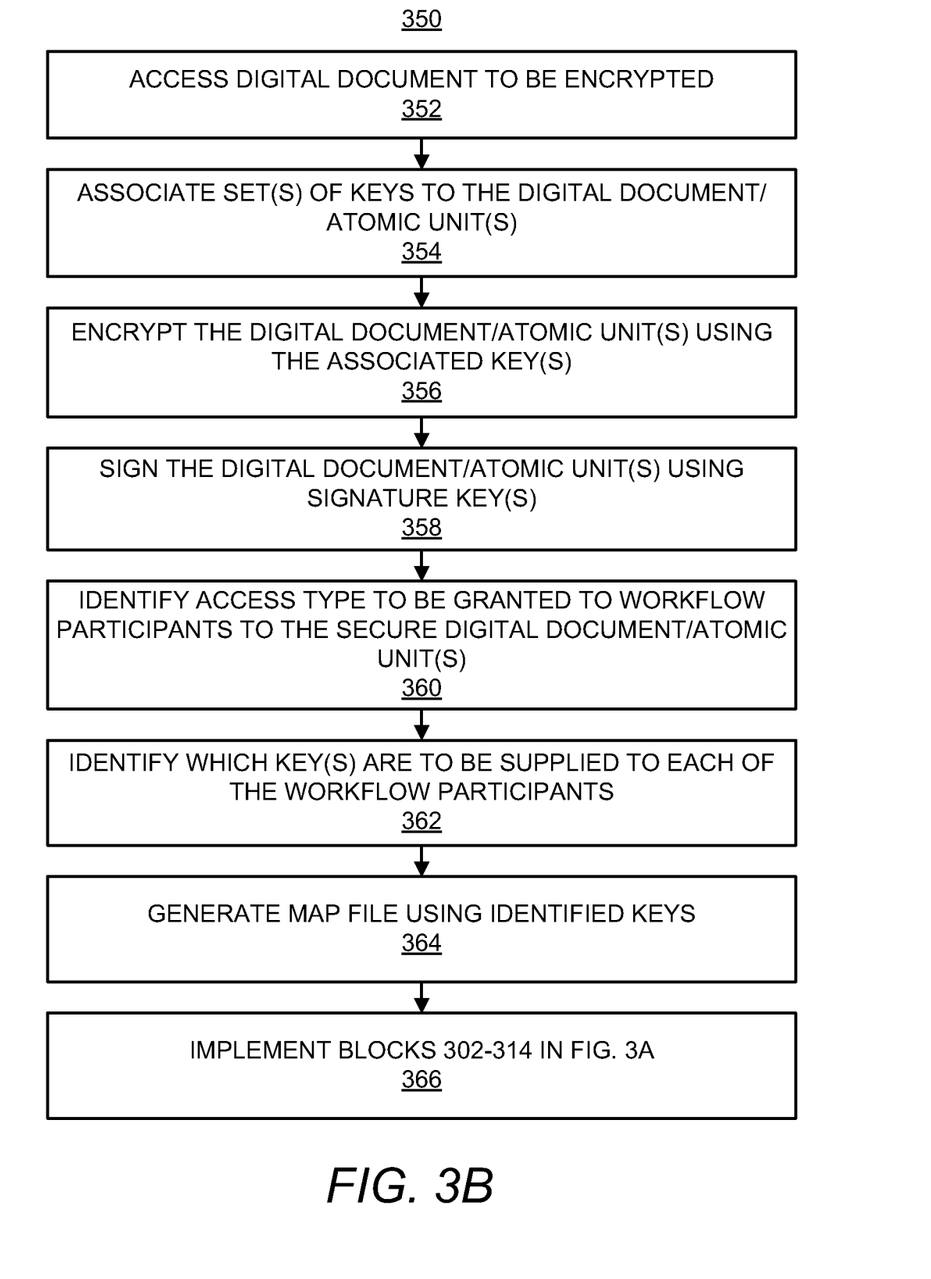

Various manners in which the modules 202-222 of the access management apparatus 102 may be implemented are described in greater detail with respect to FIGS. 3A and 3B, which respectively depict flow diagrams of methods 300 and 350 for managing access to a secure digital document 130/atomic unit(s) 122a-122n by a plurality of workflow participants 110a-110n, according to an example of the present disclosure. It should be apparent that the method 300 represents a generalized illustration and that other processes may be added or existing processes may be removed, modified or rearranged without departing from a scope of the method 300.

The description of the method 300 is made with particular reference to the access management apparatus 102 depicted in FIGS. 1 and 2. It should, however, be understood that the method 300 may be implemented in an apparatus that differs from the access management apparatus 102 without departing from a scope of the method 300.

At block 302, an entry table 140 is populated with a participant entry 142a-142n for each of a plurality of workflow participants 110a-110n, for instance, by the entry table population module 216. The entry table population module 216 may, more particularly, populate the entry table 140 such that each of the participant entries 142a-142n includes a respective first label and corresponding map entry identifier 146a-146n. As discussed above, at least some of the map entry identifiers 146a-146n correspond to at least some of the map entry tags 154a-154n contained in the map file entries 152a-152n of a map file 150. All of the map entry tags 154a-154n may not correspond to a map file entry 152a-152n of the map file because at least one of the participant entries 142a-142n may comprise a pseudo participant entry as discussed above.

In addition, at least some of the map entry tags 154a-154n include key entries 156a-156n, in which, each of the key entries 156a-156n includes a set of keys that enable a predetermined type of access to the secure digital document 130/atomic unit(s) 122a-122n. All of the map file entries 152a-152n may not be associated with respective workflow participants 110a-110n because at least one of the map file entries 152a-152n may comprise a pseudo map file entry as also discussed above.

At block 304, symmetric keys for each of the workflow participants 110a-110n are accessed, for instance, by the entry table population module 216. More particularly, for instance, a symmetric key may be generated for each of the workflow participants 110a-110n and stored in the data store 224. Otherwise, the symmetric keys for the workflow participants 110a-110n may be retrieved or received from another source, such as, the data store 224. As discussed herein, the symmetric keys are also used to encrypt respective ones of the key entries 156a-156n in the map file 150.

At block 306, at least some of the first labels 144a-144n are encrypted using the symmetric keys of respective workflow participants 110a-110n to generate a plurality of second labels 148a-148n, for instance, by the label encryption module 218. The first labels 144a-144n comprise relatively short words or other combinations of symbols and/or characters. The second labels 148a-148n thus comprise encrypted versions of the first labels 144a-144n. In addition, the label encryption module 218 may encrypt one of the first labels 144a with the symmetric key of a first workflow participant 110a, another one of the first labels 144b with the symmetric key of a second workflow participant 110a, a further one of the first labels 144c with the symmetric key of a third workflow participant 110c, etc.

More particularly, the label encryption module 218 encrypts a particular first label 144a using the symmetric key of the first workflow participant 110a, in which the particular first label 144a corresponds to the participant entry 142a containing a particular map entry identifier 146a. The particular map entry identifier 146a corresponds to the map entry tag 154a in the map file entry 152a containing the key entry 156a that has been encrypted using the symmetric key of the first workflow participant 110a. As such, the first workflow participant 110a is able to decrypt both the second label 148a correspond to the first label 144a and the key entry 156a corresponding to that first label 144a using the same symmetric key.

At block 308, the entry table 140 is populated with the second labels 148a-148n, for instance, by the entry table population module 216. The second labels 148a-148n may be arranged in any manner such that the positions of the second labels 148a-148n do not correspond to the positions of the participant entries 142a-142n. As such, there is no discernible correlation between the positions of the second labels 148a-148n and the participant entries 142a-142n. In addition, the entry table population module 216 may populate the entry table 140 with a pseudo second label, which has no association with any of the plurality of workflow participants 110a-110n, but has a similar appearance to the second labels 148a-148n.

At block 310, the symmetric keys are encrypted using the public key of a respective workflow participant 110a-110n, for instance, by the label encryption module 218. Thus, the label encryption module 218 may encrypt the symmetric key of a first workflow participant 110a with the public key of the first workflow participant 110a, the symmetric key of a second workflow participant with the public key of the second workflow participation 110b, etc.

At block 312, the entry table 140 is incorporated into the secure digital document 130, for instance, by the entry table incorporation module 220. The incorporation of the entry table 140 into the secure digital document 130 may include insertion of the encrypted symmetric keys into the secure digital document 130. According to an example, the entry table incorporation module 220 incorporates the entry table 140 into the document 130 by directly inserting the entry table 140 between content, such as, the atomic units 122a-122n of the document 130. In another example, the entry table incorporation module 218 incorporates the entry table 140 into the secure digital document 130 by adding an additional document to the secure digital document 130 containing the entry table 140. In a further example, the entry table incorporation module 218 incorporates the entry table 140 as metadata to the secure digital document 130.

At block 314, the secure digital document 130 containing the entry table 140 is outputted, for instance, by the document/map file supplying module 222. As discussed above, the document/map file supplying module 220 may output the secure digital document 130 containing the entry table 140 to at least one of the workflow participants 110a-110n and/or to the data store 224.

Turning now to FIG. 3B, the flow diagram of the method 350 pertains to managing access to a secure digital document 130/atomic unit(s) 122a-122n by a plurality of workflow participants 110a-110n, according to another example. At block 352, a digital document 120 that is to be placed into a workflow among a plurality of workflow participants 110a-110n is accessed. For instance, the access management apparatus 102 receives the digital document 120 from the input apparatus 240 through the user interface module 202. As another example, a user instructs the access management apparatus 102 to access the digital document 120 from, for instance, the data store 224. As another example, a new digital document 120 is created from a template, such as, for instance, an application form process.

At block 354, a first set of keys is associated with the digital document 120 and/or at least one of the atomic units 122a-122n, for instance, by the key association module 204. The first set of keys includes an encryption key, or alternatively a pair of encryption-decryption keys, and a pair of a signature and a verification keys. In addition, although not explicitly shown in FIG. 3B, separate sets of keys may be associated with the other atomic units 122a-122n. In addition, for the atomic units 122a-122n that contain no sensitive or private material, the set of keys may only include a signature-verification pair. Moreover, a first set of keys may be associated with a plurality of atomic units 122a-122n to, for instance, grant the same type of access to the atomic units 122a-122n associated with the first set of keys to a workflow participant 110a.

At block 356, the digital document 120/atomic units 122a-122n are encrypted using an encryption key contained in the associated set(s) of keys, for instance, by the encryption module 206. The encryption module 206 may use any standard or proprietary encryption mechanism, such as, for instance, symmetric AES encryption, Twofish encryption, Blowfish encryption, asymmetric RSA, etc., to encrypt the digital document 120/atomic units 122a-122n. According to an example, each of the atomic units 122a-122n that are to be provided with differential access types may be encrypted using respective specially generated, derived and/or assigned encryption keys. In addition, both the digital document 120 and the at least one of the atomic units 122a-122n may be encrypted using different encryption keys to therefore be able to enforce differential access to both the encrypted digital document 130 and the atomic units 122a-122n.

At block 358, the encrypted digital document 130/atomic units 122a-122n are signed using a signature key, contained in the associated set(s) of keys for the encrypted digital document 120/atomic units 122a-122n, for instance, by the signing module 208. The signing module 208 may sign the encrypted digital document 130/atomic unit 122a-122n through use of, for instance, a Digital Signature Algorithm, RSA based signatures, etc. According to an example, each of the encrypted digital document 130/atomic units 122a-122n that have been encrypted is signed using a specially assigned, generated or derived signature key.

At block 360, access types to the secure digital document 130/atomic units 122a-122n to be granted to each of the workflow participants 110a-110n are identified, for instance, by the access type identification module 210. More particularly, for instance, the access type identification module 210 may track instructions received through the user interface module 202 from the input apparatus 240 that identify the workflow participants 110a-110n that are to receive the secure digital document 130 as well as the differential access rights to be granted to each of the workflow participants 110a-110n. In addition, the access type identification module 210 may store the information received from the input apparatus 240 in the data store 224. In another example, access types to be granted to the secure digital document/atomic units 122a-122n may be stored in the data store 224 and the access type identification module 210 may access the data store 224 to retrieve the access type information.

According to an example, the workflow participants 110a-110n may be granted one of a "no access" type, a "read only access" type, and a "modify access" type. As such, for instance, a workflow participant 110a may be granted different types of access to the secure digital document 130 as a whole or to the atomic units 122a-122n contained in the secure digital document 130. In addition, a first workflow participant 110a may be granted a different type of access to the digital document 130/atomic units 122a-122n than a second workflow participant 110b.

For atomic units 122a-122n under the "no access" type, a workflow participant 110a is granted the ability to receive the secure digital document 130/atomic unit(s) 122a-122n, but is not granted the ability to open or otherwise read or modify the secure digital document 130/atomic unit(s) 122a-122n. As such, for instance, the workflow participant 110a-110n may access the secure digital document 130 containing the atomic units 122a-122n to which the workflow participant 110a has been granted the "no access" type, but may not be able to read or modify those atomic units 122a-122n. This workflow participant 110a may, however, be required to authenticate the secure digital document 130/atomic unit(s) 122a-122n to which the workflow participant 110a has been granted the no access type as well as all other ones of the secure digital document 130/atomic unit(s) 122a-122n. This situation may occur, for instance, when the workflow participant 110a has been granted access to view an atomic unit 122a-122n, but has not been granted access to view other ones of the atomic units 122a-122n. The workflow participant 110a may then be required to transfer the secure digital document 130 to at least one subsequent workflow participant 110b-110n who may have been granted access rights to those atomic units 122a-122n that are inaccessible by the workflow participant 110a. As another example, this situation may occur for instance, when the workflow participant 110a has been granted the "no access" type to the secure digital document 130/atomic units 122a-122n contained in the secure digital document 130, but has been selected to receive the appropriate keys to access the secure digital document 130/atomic units 122a-122n at a later time.

For secure digital documents 130/atomic unit(s) 122a-122n under the "read only access" type, a workflow participant 110a is granted the ability to open and access the secure digital documents 130/atomic unit(s) 122a-122n of the secure digital document 130/atomic unit(s) 122a-122n to which the workflow participant 110a has been granted the "read only access" type. However, the workflow participant 110a is not authorized to modify those secure digital documents 130/atomic units 122a-122n. In one regard, a workflow participant 110b that receives the secure digital document 130 may determine, and must automatically verify on reception, when the digital documents 130/atomic units 122a-122n have been modified by an unauthorized workflow participant 110a, as discussed in greater detail herein below.

For atomic units 122a-122n under the "modify access" type, a workflow participant 110a is granted the authorization to both read and modify the secure digital documents 130/atomic units 122a-122n to which the workflow participant has been granted the "modify access" type. In one regard, the workflow participant 110a may be supplied with corresponding signature keys to enable the workflow participant 110a to sign the secure digital document 130/atomic units 122a-122n following modification and encryption of the secure digital document 130/atomic units 122a-122n. In addition, a second workflow participant 110b identified to receive the secure digital document 130 from a first workflow participant 110a may have been provided with an appropriate verification key, which the second workflow participant 110b may use to determine whether the first workflow participant 110a was authorized to modify the secure digital document 130/atomic units 122a-122n. The second workflow participant 110b, if granted at least the read only access, may also be provided with an appropriate decryption key to be able to decrypt the modified secure digital document 130/atomic units 122a-122n.

At block 362, an identification of which keys are to be supplied to each of the workflow participants 110a-110n for the secure digital document 130/atomic unit(s) 122a-122n is made based upon the identified type of access, for instance, by the key identification module 212. Thus, for instance, for a first atomic unit 122a, a first workflow participant 110a and a second workflow participant 110b may be identified to receive the same set of keys. As another example, for a second atomic unit 122b, the first workflow participant 110a may be determined to receive a different set of keys from the second workflow participant 110b, and so forth. As such, multiple workflow participants 110a-110n may be given different types of access to the same secure digital document 130/atomic unit 122a-122n.

According to an example, for those secure digital documents 130/atomic units 122a-122n that workflow participants 110a-110n are to be granted the "no access" type, the key identification module 212 may determine that those workflow participants 110a-110n are to receive the verification keys for those secure digital documents 130/atomic units 122a-122n without the encryption or signature keys for those secure digital documents 130/atomic units 122a-122n. For those secure digital documents 130/atomic units 122a-

122n that workflow participants 110a-110n are to be granted the "read only access" type, the key identification module 212 may determine that those workflow participants 110a-110n are to receive the decryption keys and the verification keys, without the encryption and signature keys. For those secure digital documents 130/atomic units 122a-122n that workflow participants 110a-110n are to be granted the "modify access" type, the key identification module 212 may determine that those workflow participants 110a-110n are to receive the encryption keys, the verification keys and the signature keys for those secure digital documents 130/atomic units 122a-122n.

At block 364, a map file 150 is generated using the identified keys for the workflow participants 110a-110n, for instance, by the map file generation module 214. More particularly, the map file generation module 214 may generate the map file 150 by generating a plurality of map file entries 152a-152n, in which each of the map file entries 152a-152n corresponds to access to the secure digital document/atomic units 122a-122n by a particular workflow participant 110a-110n. Thus, for instance, a first map file entry 152a may be associated with a first workflow participant 110a to access a particular atomic unit 122a. In addition, a second map file entry 152b may be associated with a second workflow participant 110b to access the atomic unit 122a, and so forth.

The map file generation module 214 may also insert the keys used to encrypt the secure digital document 130/atomic units 122a-122n into respective key entries 156a-156n. In addition, the map file generation module 214 may encrypt the key entries 156a-156n using respective public keys of the workflow participants 110a-110n. Thus, in the example above, the map file generation module 214 may encrypt the key entry 156a contained in the first map file entry 152a with the public key of the first workflow participants 110a. In addition, the map file generation module 214 may encrypt the key entry 156b contained in the second map file entry 152b with the public key of the second workflow participant 110b, and so forth. The map file generation module 214 may also associate map entry tags 154a-154n with the key entries 156a-156n in each of the map file entries 152a-152n.

At block 366, blocks 302-314 from FIG. 3A are implemented to populate and incorporate an entry table 140 into the encrypted and signed digital document 130. More particularly, for instance, the management apparatus 102 may correlate the map entry identifiers 146a-146n to be inserted into the entry table 140 to the map entry tags 154a-154n of the map file 150. In addition, the management apparatus 102 may correlate the first labels 144a-144n to each of the map entry identifiers 146a-146n and may encrypt first labels 144a-144n using the public keys of the workflow participants 110a-110n, in which the same public keys used to encrypt a particular key entry 156a in the map file 150 is used to encrypt the first label 144a that corresponds to that particular key entry 156a.

Figure 4:
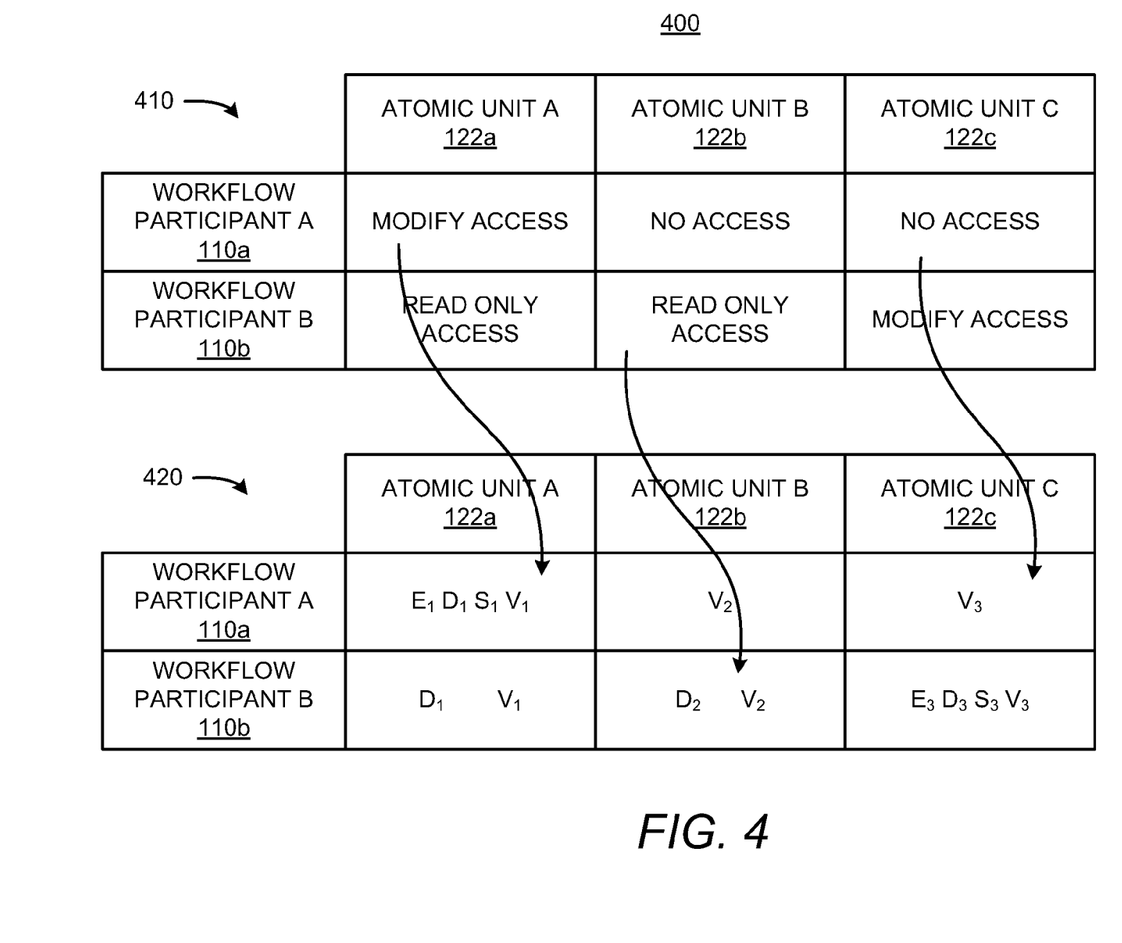
FIG. 4 shows a diagram of a manner in which differential access is provided to multiple workflow participants, according to an example of the present disclosure.

Turning now to FIG. 4, there is shown a diagram 400 of a manner in which differential access may be provided to multiple workflow participants 110a and 110b, according to an example. It should be understood that the diagram 400 is a generalized illustration and that other elements may be included therein without departing from a scope of the diagram 400. Thus, for instance, although two workflow participants 110a and 110b have been depicted in the diagram 400, it should be understood that various principles disclosed therein may be applied to any number of workflow participants 110c-110n.

The diagram 400 includes two charts 410 and 420. Both of the charts 410 and 420 depict a simple case of two workflow participants 110a and 110b and three atomic units 122a-122c. The first chart 410 depicts an example of the access types that each of the workflow participants 110a and 110b is provided to each of the atomic units 122a-122c. The second chart 420 depicts the corresponding sets of keys supplied to the workflow participants 110a and 110b based upon the type of access that the workflow participants 110a and 110b have been granted for each of the atomic units 122a-122c. In the example depicted in FIG. 4, the first workflow participant 110a has been granted the "modify access" type to the first atomic unit 122a and a no access type to the second and third atomic units 122b and 122c. In addition, the second workflow participant 110b has been granted the read only access type to the first and second atomic units 122a and 122b and the "modify access" type to the third atomic unit 122c.

As shown in the second chart 420, for the first atomic unit 122a, the first workflow participant 110a is supplied with encryption and decryption keys ($E_1$, $D_1$) and the signature and verification keys ($S_1$, $V_1$) for that atomic unit 122a. In addition, the second workflow participant 110b is supplied with just the decryption and verification keys ($D_1$, $V_1$) for the first atomic unit 122a. For the second and third atomic units 122b and 122c, the first workflow participant 110a is supplied with just the verification keys ($V_2$, $V_3$) for those atomic units 122b and 122c. For the second atomic unit 122b, the second workflow participant 110b is supplied with the decryption and verification keys ($D_2$, $V_2$) for that atomic unit 122b. For the third atomic unit 122c, the second workflow participant 110b is supplied with the encryption and decryption keys ($E_3$, $D_3$) and the signature and verification keys ($S_3$, $V_3$) for that atomic unit 122c.

In instances where the second workflow participant 110b is intended to access the first atomic unit 122a following modification by the first workflow participant 110a, the second workflow participant 110b is supplied with a second set of keys to be able to authenticate the modification to the at least one atomic unit 122a by the first workflow participant 110a. The second set of keys may differ from the first set of keys to thus enable the second workflow participant 110b to verify the signature of the first workflow participant 110a.

Some or all of the operations set forth in the figures may be contained as a utility, program, or subprogram, in any desired computer readable storage medium. In addition, the operations may be embodied by computer programs, which may exist in a variety of forms both active and inactive. For example, they may exist as machine readable instruction(s) comprised of program instructions in source code, object code, executable code or other formats. Any of the above may be embodied on a computer readable storage medium, which include storage devices.

Example computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 5:
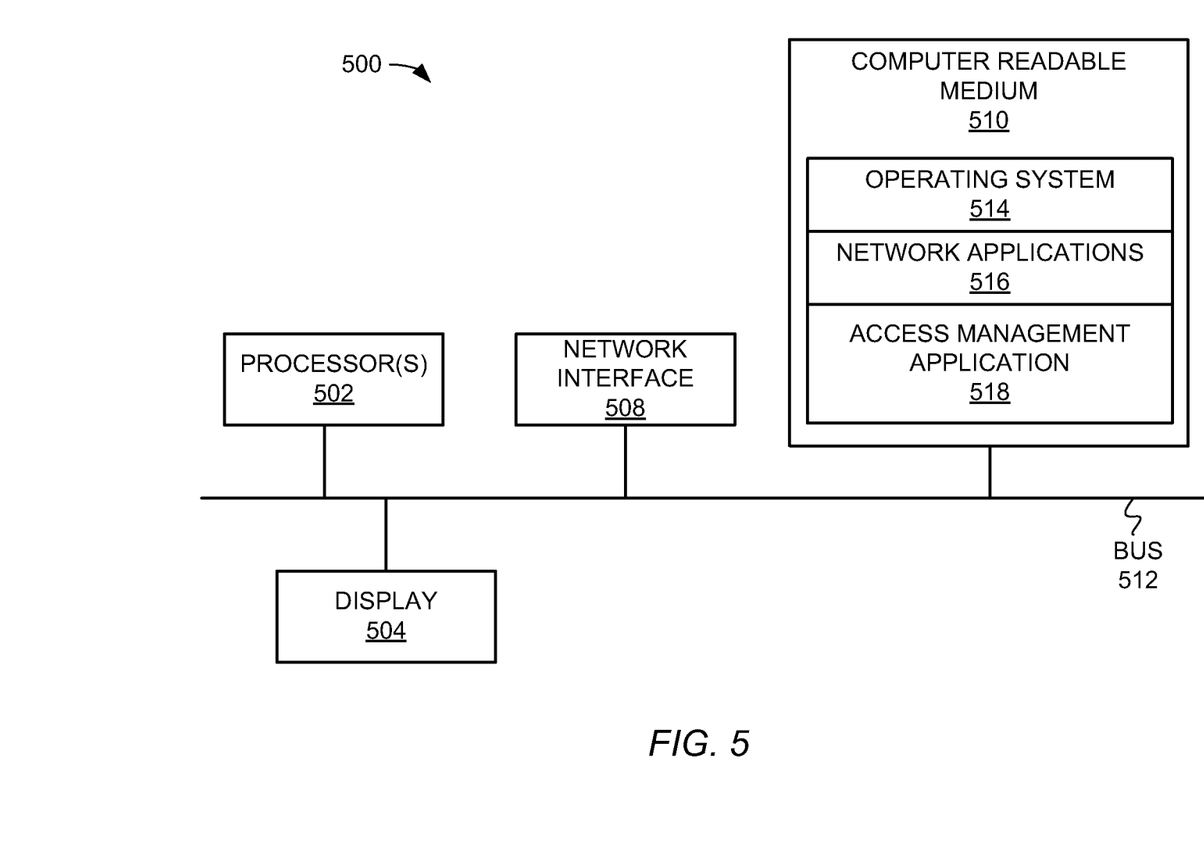
FIG. 5 shows a block diagram of a computer system that may be used as a platform for implementing or executing at least one of the processes depicted in FIGS. 3A and 3B, according to an example of the present disclosure.

Turning now to FIG. 5, there is shown a schematic representation of a computing device 500 that may be used as a platform for implementing or executing at least one of the processes depicted in FIGS. 3A and 3B, according an example. The device 500 includes a processor 502, such as a central processing unit; a display device 504, such as a monitor; a network interface 508, such as a Local Area Network LAN, a wireless 802.11x LAN, a 3G mobile WAN or a WiMax WAN; and a computer-readable medium 510. Each of these components is operatively coupled to a bus 512. For example, the bus 512 may be an EISA, a PCI, a USB, a FireWire, a NuBus, or a PDS.

The computer readable medium 510 may be any suitable medium that participates in providing instructions to the processor 502 for execution. For example, the computer readable medium 510 may be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 510 may also store other machine readable instructions, including word processors, browsers, email, Instant Messaging, media players, and telephony machine readable instructions.

The computer-readable medium 510 may also store an operating system 514, such as Mac OS, MS Windows, Unix, or Linux; network applications 516; and an access management application 518. The operating system 514 may be multi-user, multiprocessing, multitasking, multithreading, real-time and the like. The operating system 514 may also perform basic tasks, such as recognizing input from input devices, such as a keyboard or a keypad; sending output to the display 504 and the design tool 506; keeping track of files and directories on medium 510; controlling peripheral devices, such as disk drives, printers, image capture device; and managing traffic on the bus 512. The network applications 516 includes various components for establishing and maintaining network connections, such as machine readable instructions for implementing communication protocols including TCP/IP, HTTP, Ethernet, USB, and FireWire.

The access management application 518 provides various machine readable instructions for controlling distribution of keys of a digital document to a plurality of workflow participants, as described above. In certain examples, some or all of the processes performed by the application 518 may be integrated into the operating system 514. In certain examples, the processes may be at least partially implemented in digital electronic circuitry, or in computer hardware, machine readable instructions (such as, firmware and/or software), or in any combination thereof.

What has been described and illustrated herein are various examples of the present disclosure along with some of their variations. The terms, descriptions and figures used herein are set forth by way of illustration only and are not meant as limitations. Many variations are possible within the spirit and scope of the present disclosure, wherein the present disclosure is intended to be defined by the following claims—and their equivalents—in which all terms are mean in their broadest reasonable sense unless otherwise indicated.

What is claimed is:

1. method for managing access to a secure digital document by a plurality of workflow participants, wherein a respective public key is associated with each of the workflow participants, said method comprising:
   generating a map file;
   populating an entry table with a participant entry for each of the workflow participants, each of said participant entries including,
   a map entry identifier that corresponds to a map entry tag in the map file, and wherein the map entry tag corresponds to a key entry in the map file, the key entry comprising a set of keys to decrypt the secure digital document and enable a predetermined type of access to the secure digital document, wherein the map file is separate from the entry table; and
   a first label associated with the map entry identifier, wherein the first label differs from the map entry identifier;
   accessing symmetric keys for the workflow participants;
   encrypting each of the first labels using a respective symmetric key of the workflow participants to generate a plurality of second labels;
   populating the entry table with the plurality of second labels;
   encrypting each of the symmetric keys with the respective public key associated with the workflow participants; and
   incorporating the entry table into the secure digital document.

2. The method according to claim 1, further comprising:
   supplying the secure digital document to a workflow participant of the plurality of workflow participants.

3. The method according to claim 1, wherein a first key entry in the map file is encrypted using a symmetric key of a first workflow participant; said method further comprising:
   determining which of the participant entries contains the map entry identifier corresponding to the map entry tag in the map file corresponding to the key entry containing the first key entry; and
   wherein encrypting the first labels further comprises encrypting a first label of the participant entry determined to contain the map entry identifier corresponding to the map entry tag in the map file corresponding to the key entry containing the first key entry using the symmetric key of the first workflow participant to generate a second label corresponding to the first label.

4. The method according to claim 1, wherein each of the key entries in the map file is encrypted using the respective symmetric key of the workflow participants, said method comprising:
   determining which of the participant entries corresponds to which of map file entries; and
   wherein encrypting each of the first labels further comprises encrypting the first labels using the respective symmetric keys of the workflow participants according to the determined correspondence between the participant entries and the map file entries.

5. The method according to claim 1, further comprising:
   encrypting the secure digital document with an encryption key; and
   signing the encrypted secure digital document with a signature key.

6. The method according to claim 5, further comprising:
   identifying a type of access from a plurality of access levels to the secure digital document to be granted to each of the workflow participants;
   identifying which of a plurality of keys to supply to each of the workflow participants based upon the identified type of access to be granted to each of the workflow participants;
   inserting the identified keys into associated key entries of the map file;
   encrypting the associated key entries using respective symmetric keys of the workflow participants;
   associating map entry tags with the associated key entries; and
   generating the map file with the associated key entries and associated map entry tags.

7. The method according to claim 1, wherein the secure digital document comprises a plurality of atomic units, said method further comprising:
  associating respective sets of keys to the plurality of atomic units, each of said respective set of keys comprising an encryption key a signature key, and a verification key;
  encrypting a first atomic unit of the plurality of atomic units with the encryption key associated with the first atomic unit;
  signing the first atomic unit with the signature key associated with the first atomic unit;
  identifying a type of access from a plurality of access levels to the first atomic unit to be granted to the workflow participants;
  identifying which of the respective sets of keys to supply to each of the workflow participants based upon the identified type of access to be granted to each of the workflow participants;
  inserting the identified keys into respective key entries of the map file;
  encrypting the respective key entries using respective public keys of the workflow participants;
  associating map entry tags with the respective key entries; and
  generating the map file with the respective key entries and associated map entry tags.

8. The method according to claim 1, further comprising:
  populating the entry table with a pseudo participant entry and a pseudo second label, wherein the pseudo participant entry and the pseudo second label have no association with any of the plurality of workflow participants and respectively have similar appearances to the participant entries and second labels.

9. The method according to claim 8, further comprising:
  inserting a pseudo map file entry into the map file, wherein the pseudo map file entry has no association with any of the set of keys to decrypt the secure digital document, and wherein a number of pseudo participant entries is equivalent to a number of pseudo map file entries.

10. An apparatus for managing access to a secure digital document by a plurality of workflow participants, wherein a respective public key is associated with each of the workflow participants, said apparatus comprising:
  a processor; and
  a memory on which is stored machine readable instructions that when executed by the processor cause, the processor to:
  generate a map file;
  populate an entry table with a participant entry for each of the workflow participants, each of said participant entries including,
  a map entry identifier that corresponds to a map entry tag in a map file, and wherein the map entry tag corresponds to a key entry in the map file, the key entry comprising a set of keys to decrypt the secure digital document and enable a predetermined type of access to the secure digital document, wherein the map file is separate from the entry table; and
  a first label associated with the map entry identifier, wherein the first label differs from the map entry identifier;
  access symmetric keys for the workflow participants;
  encrypt each of the first labels using a respective symmetric key of the workflow participants to generate a plurality of second labels;
  populate the entry table with the plurality of second labels;
  encrypt each of the symmetric keys with the respective public key associated with each of the workflow participants; and incorporate the entry table into the secure digital document.

11. The apparatus according to claim 10, wherein a first key entry in the map file is encrypted using a symmetric key of a first workflow participant, and wherein the machine readable instructions further cause the processor to are further to:
  determine which of the participant entries contains the map entry identifier corresponding to the map entry tag in the map file corresponding to the key entry containing the first key entry;
  encrypt a first label of the participant entry determined to contain the map entry identifier corresponding to the map entry tag in the map file corresponding to the key entry containing the first key entry using the symmetric key of the first workflow participant to generate a second label corresponding to the first label.

12. The apparatus according to claim 10, wherein each of the key entries in the map file is encrypted using the respective symmetric key of the workflow participants, said machine readable instructions further cause the processor to:
  determine which of the participant entries corresponds to which of the map file entries; and encrypt the first labels using the respective symmetric keys of the workflow participants according to the determined correspondence between the participant entries and the map file entries.

13. The apparatus according to claim 10, wherein the machine readable instructions further cause the processor to encrypt the secure digital document with an encryption key and to sign the encrypted secure digital document with a signature key.

14. The apparatus according to claim 13, wherein the machine readable instructions further cause the processor to:
  identify a type of access from a plurality of access levels to the secure digital document to be granted to each of the workflow participants;
  identify which of a plurality of keys to supply to each of the workflow participants based upon the identified type of access to be granted to each of the workflow participants;
  insert the identified keys into associated key entries of the map file;
  encrypt the associated key entries using respective symmetric keys of the workflow participants;
  associate map entry tags with the associated key entries; and generate the map file with the associated key entries and associated map entry tags.

15. The apparatus according to claim 14, wherein the secure digital document: comprises a plurality of atomic units, said machine readable instructions further cause the processor to:
  associate respective sets of keys to the plurality of atomic units, each of said respective set of keys comprising an encryption key, a signature key, and a verification key;
  encrypt a first atomic unit of the plurality of atomic units with the encryption key associated with the first atomic unit;
  sign the first atomic unit with the signature key associated with the first atomic unit;
  identify a type of access from a plurality of access levels to the first atomic unit to be granted to the workflow participants;

identify which of the respective sets of keys to supply to each of the workflow participants based upon the identified type of access to be granted to each of the workflow participants;

insert the identified keys into respective key entries of the map file;

encrypt the respective key entries using respective public keys of the workflow participants;

associate map entry tags with the respective key entries; and to generate the map file with the respective key entries and associated map entry tags.

16. The apparatus according to claim 10, wherein the machine readable instructions further cause the processor to populate the entry table with a pseudo participant entry and a pseudo second label, wherein the pseudo participant entry and the pseudo second label have no association with any of the plurality of workflow participants and respectively have similar appearances to the participant entries and second labels.

17. The apparatus according to claim 16, wherein the machine readable instructions further cause the processor to insert a pseudo map file entry into the map file, wherein the pseudo map file entry has no association with any of the set of keys to decrypt the secure digital document, and wherein a number of pseudo participant entries is equivalent to a number of pseudo map file entries.

18. non-transitory computer readable storage medium on which is embedded a computer program, said computer program implementing a method for managing access to a secure digital document by a plurality of workflow participants, said computer program comprising a set of instructions to:

generate a map file;

populate an entry table with a participant entry for each of the workflow participants, each of said participant entries including, a map entry identifier that corresponds to a map entry tag in a map file, and wherein the map entry tag corresponds to a key entry in the map file, the key entry comprising a set of keys to decrypt the secure digital document and enable a predetermined type of access to the secure digital document, wherein the map file is separate from the entry table; and a first label associated with the map entry identifier, wherein the first label differs from the map entry identifier;

access symmetric keys for the workflow participants;

encrypt each of the first labels using a respective symmetric key of the workflow participants to generate a plurality of second labels;

populate the entry table with the plurality of second labels;

encrypt each of the symmetric keys with a respective public key associated with each of the workflow participants; and incorporate the entry table into the secure digital document.

19. The non-transitory computer readable storage medium according to claim 18, wherein a first key entry in the map file is encrypted using a symmetric key of a first workflow participant, said computer program further comprising a set of instructions to:

determine which of the participant entries contains the map entry identifier corresponding to the map entry tag in the map file corresponding to the key entry containing the first key entry; and encrypt a first label of the participant entry determined to contain the map entry identifier corresponding to the map entry tag in the map file corresponding to the key entry containing the first key entry using the symmetric key of the first workflow participant to generate a second label corresponding to the first label.

20. The non-transitory computer readable storage medium according to claim 18, wherein each of the key entries in the map file is encrypted using the respective symmetric key of the workflow participants, said computer program further comprising a set of instructions to:

determine which of the participant entries corresponds to which of the map file entries; and encrypt the first labels using the respective symmetric keys of the workflow participants according to the determined correspondence between the participant entries and the map file entries.

* * * * *

UNITED STATES PATENT AND TRADEMARK OFFICE
CERTIFICATE OF CORRECTION

PATENT NO. : 9,608,811 B2  
APPLICATION NO. : 12/949510  
DATED : March 28, 2017  
INVENTOR(S) : Helen Balinsky et al.

Page 1 of 1

It is certified that error appears in the above-identified patent and that said Letters Patent is hereby corrected as shown below:

In the Claims

In Column 17, Line 57, in Claim 1, delete "method" and insert -- A method --, therefor.

In Column 18, Line 41, in Claim 4, delete "of map" and insert -- of the map --, therefor.

In Column 20, Lines 10-11, in Claim 11, delete "to are further to:" and insert -- to: --, therefor.

In Column 21, Line 10, in Claim 15, delete "and to" and insert -- and --, therefor.

In Column 21, Line 27, in Claim 18, delete "non-transitory" and insert -- A non-transitory --, therefor.

Signed and Sealed this  
Twelfth Day of September, 2017

Joseph Matal  
*Performing the Functions and Duties of the*  
*Under Secretary of Commerce for Intellectual Property and*  
*Director of the United States Patent and Trademark Office*